United States Patent [19]

Bonfig et al.

[11] 4,010,644
[45] Mar. 8, 1977

[54] METHOD FOR COMPENSATION OF THE ELECTROCHEMICAL PERTURBING DIRECT CURRENT POTENTIAL IN INDUCTIVE FLOW MEASUREMENT WITH A PERIODICALLY SWITCHED UNIFORM FIELD

[75] Inventors: Karl Walter Bonfig, Bochum-Stiepel; Friedrich Hofmann, Duisburg-Grossenbaum; Wolfgang Stelz, Oberhausen, all of Germany; Ronald van der Pol, Venlo, Netherlands

[73] Assignee: Ludwig Krohne K.G., Duisberg, Germany

[22] Filed: Feb. 28, 1975

[21] Appl. No.: 554,005

[30] Foreign Application Priority Data

Mar. 5, 1974 Germany .......................... 2410407

[52] U.S. Cl. .................................. 73/194 EM
[51] Int. Cl.[2] ................................ G01F 1/58
[58] Field of Search ...................... 73/194 EM

[56] References Cited

UNITED STATES PATENTS

| | | | |
|---|---|---|---|
| 3,316,762 | 5/1967 | Westersten | 73/194 EM |
| 3,550,446 | 12/1970 | Tucker et al. | 73/194 EM |
| 3,714,806 | 2/1973 | Berkey et al. | 73/88.5 R |
| 3,965,738 | 6/1976 | Watanabe | 73/194 EM |

*Primary Examiner*—Charles A. Ruehl
*Attorney, Agent, or Firm*—Holman and Stern

[57] ABSTRACT

When measuring the velocity of fluid flow by measuring the voltage produced by magnetic induction applied to the fluid, measurement is affected by the electrochemical potential developed at the electrodes. This may be compensated by storing the total signal produced with a first value of the induction and subtracting this stored signal from the total signal produced at a second value of the induction so that the electrochemical potential cancels out.

12 Claims, 12 Drawing Figures

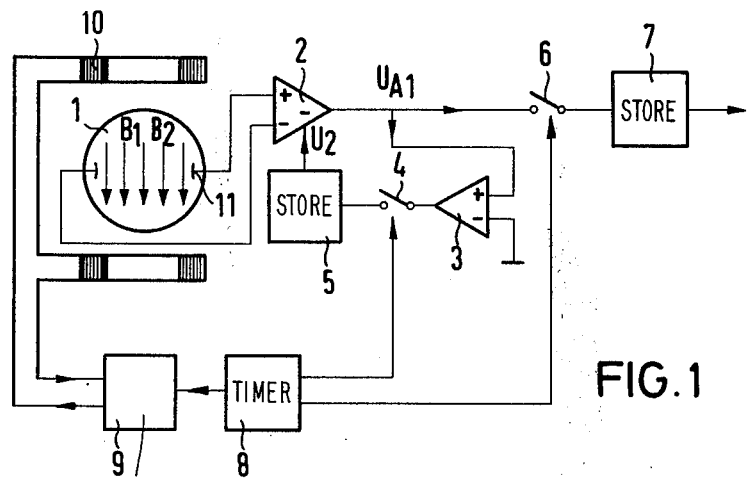
FIG.1
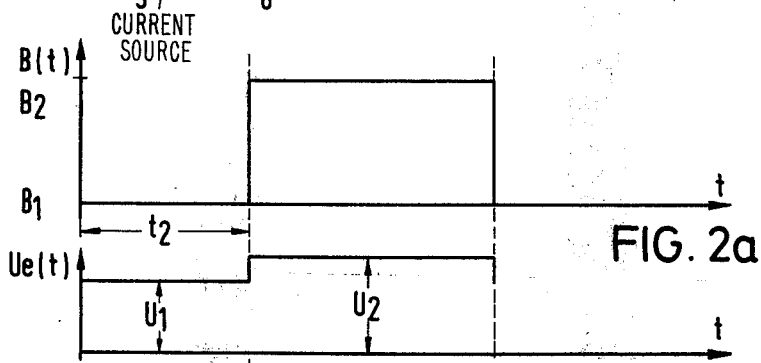
FIG. 2a
FIG. 2b
FIG. 2c

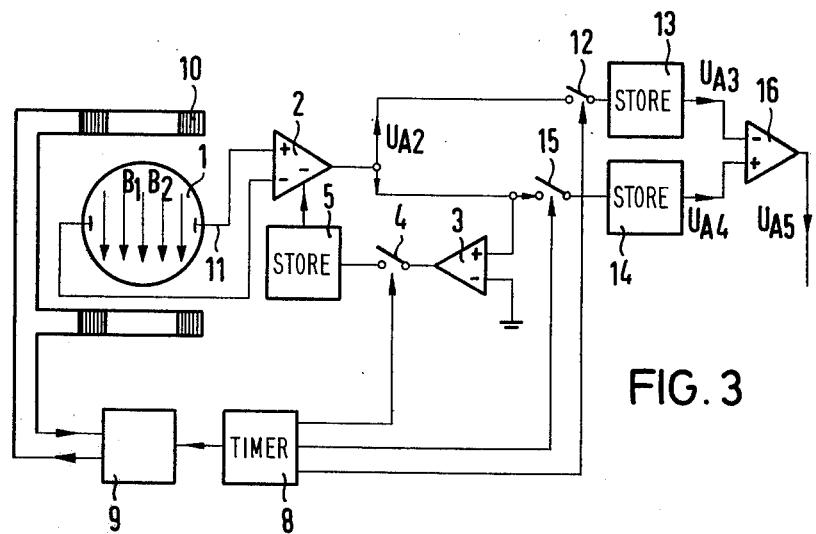
FIG. 3
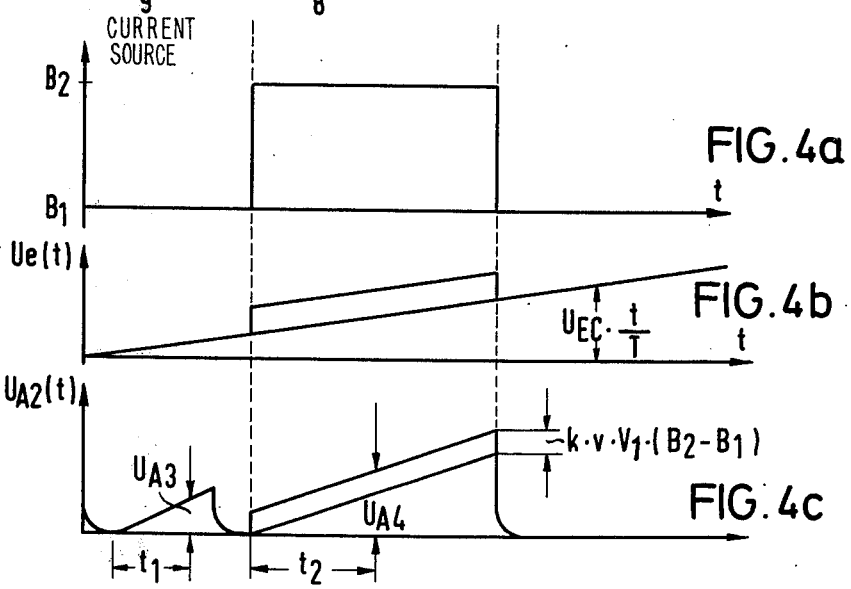
FIG. 4a
FIG. 4b
FIG. 4c

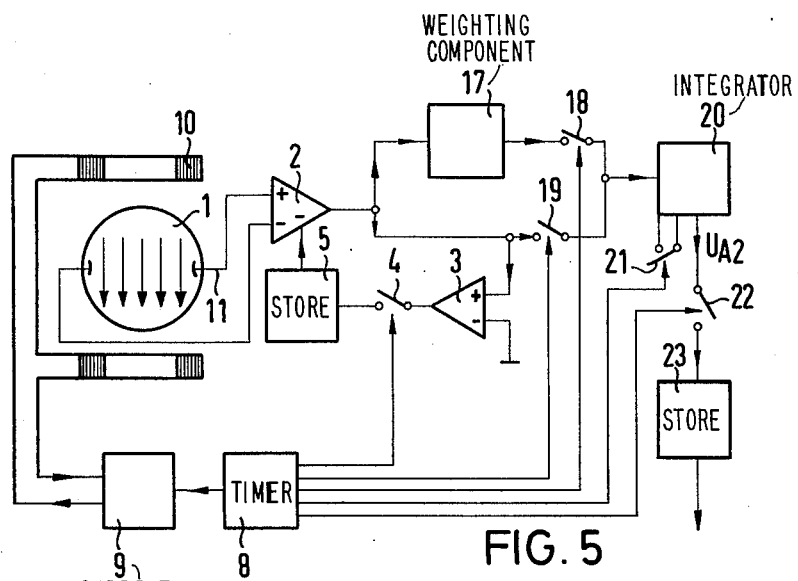

METHOD FOR COMPENSATION OF THE ELECTROCHEMICAL PERTURBING DIRECT CURRENT POTENTIAL IN INDUCTIVE FLOW MEASUREMENT WITH A PERIODICALLY SWITCHED UNIFORM FIELD

FIELD OF THE INVENTION

The invention relates to methods of compensation of the electrochemical perturbing direct current potential in inductive flow measurement with a uniform field which is continually switched back and forth between two values of induction.

BACKGROUND OF THE INVENTION

In inductive flow measurements with constant (d.c.) field of the direct current voltage induced in a flowing fluid, the amplitude of which induced voltage is of the order of magnitude of a few microvolts, in order to separate this induced voltage from the electrochemical potential, which can reach up to $10^5$ — fold values of the actual current being measured, it is known from DT-AS 2 052 175 to compensate the electrochemical potential with the use of a periodically switched constant (d.c.) field, the perturbing potential is stored with the magnetic field switched off and then, from the total signal produced with the magnetic field switched on, the required voltage and the perturbing potential are separated. Alternatively the magnetic field is alternately reversed in direction, so that the required voltage changes its polarity, while the perturbing potential maintains its polarity. Compensation is achieved in that the total signal of the required voltage and perturbing potential and the difference signal of the perturbing potential minus the required voltage is stored and from the difference of the two stored signals the required signal is determined, freed from perturbing potentials.

These methods require however a high expenditure on circuitry, in order to detect with the necessary exactness the required signal, which is smaller than the perturbing signal by a factor of about $10^5$, in the differencing process. Furthermore, for the accomplishing of this method, two stores and a difference amplifier are required. In this connection it cannot be avoided that the intrinsic errors in the stores and difference amplifiers may possibly add, so that from this cause also a mistake may arise in the measurement.

An additional method is disclosed in the above cited prior art document, namely, periodically short-circuiting the measurement electrodes and the input direct current voltage amplifier, and measuring and storing the required voltage for a short time directly after the removal of this short-circuiting, before it is falsified by the slow build-up of the electrochemical potential. A range of perturbing side-effects arise with this prior art method because of the effect which is thereby exerted on the actual measurement standard, which makes it very difficult to measure the required voltage with the necessary accuracy.

SUMMARY OF THE INVENTION

An object of the invention is therefore to develop a method of measurement which achieves the compensation of the perturbing voltage in a simple manner and with low expenditure on the circuitry. It should furthermore largely exclude additional side-effects which influence the accuracy of measurement, such as for instance variation of the perturbing direct current potential between the succeeding magnetic field phases, and other time-dependent effects in the circuit.

This object is achieved with a method of the type referred to above by employing the following inventions. The total signal created by the first value of the induction, consisting of the required and perturbing signal, is regulated to zero at the output of an amplifier, by applying a corresponding compensating magnitude thereto. This compensating magnitude is stored and the perturbing potential present in the total signal from the second induction value is compensated by the stored magnitude. According to a further feature of the invention the compensating magnitude can be applied through a central amplifier in the feedback loop.

In comparison with the known methods, this method achieves greater accuracy, because the errors which arise in the input and in the amplification of the differenced measured quantities are practically eliminated by the compensation, in particular by the use of control (feedback) amplifier. Furthermore, a store is eliminated, so that this source of error also disappears.

In this method it is assumed that the electrochemical perturbing potential does not vary between the succeeding magnetic field phases. However, this is not necessarily so in practice. It has been ascertained that the electrochemical potential depends firstly on the electrochemical characteristics of the (through) flowing medium and secondly, in the case of the low flow speeds, can vary with the flow speed which is being measured. Voltage rises have been determined in one second reaching up to 5000 times the value of the underlying signal which is to be evaluated. Further it is still neglected that the output voltage of the stores, depending on the type of store, is not constant exactly, but tends to fall off with time.

In order to further exclude the influence of these perturbing magnitudes, in a further development of the invention it is proposed that all errors arising from the slow time-dependent variation of the electrochemical perturbing potential should be suppressed by measuring these variations of the perturbing magnitudes independently of the time-point of the actual measurement of the required voltage. Then as certain from the measured values of the perturbing magnitudes, the value obtaining at the time-point of the actual measurement of the required voltage by interpolation or extrapolation. This result may then be used as a correcting value.

In this connection the fact is utilized that the time-constants of the perturbing magnitudes, which usually run according to exponential functions, are of the order of magnitude of minutes or hours. As the duration of the measurement cycles is of the order of magnitude of milliseconds or seconds, it is a good approximation that during the period of the measurement cycle the perturbing magnitudes vary in a manner proportional to the time and that their speeds of increase therefore remain constant. It is therefore possible to determine the variation of the perturbing magnitudes during one measurement phase for the next measurement phase by a linear interpolation or extrapolation and to correct for their effect.

This method enables the measurement to be easily achieved, with low expenditure on circuitry for the suppression of the variation of the perturbing magnitudes and the internal constant error voltages of the amplifier. The sum of the perturbing magnitudes of the one induction value is compensated and in a time interval thereafter the variation thereof is measured and stored as a correcting value. The compensating step is then repeated for the second induction value, in the same time interval as with the first determination of the correcting value, the sum of the required signal and variations of the perturbing magnitudes is measured and from this sum the correcting value is subtracted.

However, with this method the indication of the required voltage may be impaired by noise in the input amplifier or by statistical disturbances in the connections between the generator and the amplifier. If it is desired to exclude these effects too, this is possible, albeit with somewhat larger expenditure on circuitry, by the use of the method step as follows. With the one induction value after the compensation of the electrochemical perturbing voltage and other perturbing magnitudes, the value of the compensation error as a first correction signal is measured and stored. A fixed time after this measurement according to the second induction value, the total signal of the required voltage, the compensation errors and variations of the values of the perturbing magnitudes is measured and stored. In the same time interval thereafter, the sum of the compensation errors and of the value of the further advanced variation of the perturbing magnitudes is measured and stored as a second correcting value. The mean of the first and second correcting signal is then subtracted from the total signal measured with the second induction value, yielding the corrected value. This method offers moreover the further advantage that perturbations which are caused by fixed frequencies, such as the mains frequency or by eddy currents in the generator, can be suppressed by phase-fixed coupling of the time-interval controls at the perturbing frequency, which with the above described method may provide an additional balancing of the two stores in the same phase displacement.

In general it has been demonstrated that, apart from the described applications, the method according to the invention can be used with advantage in measurement technology wherever magnitudes are to be ascertained which depend on an exciting magnitude and are affected by perturbing signals of the described or similar nature.

DESCRIPTION OF THE FIGURES

The invention will be further explained by way of example only, with reference to the methods represented in the drawings. These show:

FIG. 1 a block diagram flow measuring amplifier with compensation according to the invention of the electrochemical perturbing voltage, FIGS. 2a, 2b, and 2c the time sequence of magnetic induction and voltages in the amplifier constructed according to FIG. 1, FIG. 3 a block diagram of a further modified measuring amplifier with double compensation during a measurement cycle and linear extrapolation of the errors in measurement caused by perturbing magnitudes, FIGS. 4a, 4b, and 4c the time sequence of the magnetic induction and voltages in an amplifier constructed according to FIG. 3, FIG. 5 a block diagram of a further amplifier according to the invention with single compensation during a cycle and linear interpolation of the errors of measurement caused by perturbing magnitudes and FIGS. 6a, 6b, and 6c the time sequence of the magnetic induction and voltages in an amplifier according to FIG. 5.

DISCUSSION OF THE PREFERRED EMBODIMENT

The block diagram of FIG. 1 shows, schematically represented, a flow generator (MHD generator), whose magnetic coil 10 is fed by a current source 9. Due to periodic switching forwards and backwards between two values of induction $B_1$ and $B_2$, there is received at the electrode 11 the voltage $$U_1 = U_{EC} + k \cdot v \cdot B_1 \text{ and}$$

$$U_2 = U_{EC} + k \cdot v \cdot B_2$$

where
$U_{EC}$ = electrochemical perturbing direct current voltage
$k$ = constant of the generator
$v$ = flow velocity
$B_1$ = induction in measurement phase 1
$B_2$ = induction in measurement phase 2

During the measurement phase with the induction $B_1$ the switch 4 closes for a short time. The output signal of the (measuring) amplifier, which includes the total signal of the required direct current voltage and the perturbing potential, is thereby regulated to zero by the control (feedback) amplifier 3 working with high amplification and the store 5, as a corresponding compensating magnitude is fed to the amplifier by the control (feedback) amplifier 3. In this connection, apart from the input of the amplifier, for the supplying of the compensating magnitude the use of other suitable points of contact lying in the signal processing chain, such as for example the electrodes themselves, may be considered.

Thus there is applied to the contact point of the amplifier 2 a voltage dependent on $U_1$ and of reversed sign. After the opening of the switch 4, this voltage dependent on $U_1$ is held by the store 5. The magnetic field is now switched to the value $B_2$, so that the input of the amplifier 2 is supplied with the voltage $U_2$. To simplify the equations it will now be assumed that the compensating voltage dependent on $U_1$ is proportional to $U_1$ and that the constant of proportionality is 1, which can be achieved by suitable amplification. There then results at the output of the (measuring) amplifier a voltage $$U_{A1} = V_1(U_2 - U_1) = V_1((U_{EC} + k \cdot v \cdot B_2) - (U_{EC} + k \cdot v \cdot B_1)) = V_1 \cdot k \cdot v(B_2 - B_1).$$

where $V_1$ is the amplification of the measuring amplifier 2. In order to have the output voltage produced in the magnetic field phase $B_2$ continuously available, this voltage is conveyed through the switch 6 into the store 7, so that it is available as the output voltage $U_{A2}$. This voltage is then independent of the frequency of the magnetic field, and of the respective periods of time in which the magnetic field is at its respective values.

The time variation of the described functional sequence proceeds in accordance with the diagrams of FIGS. 2a – c, in which the time $t$ is entered in each case with the same scale on the ordinate. FIG. 2a shows how the induction is switched back and forth in equal time intervals between the values $B_1$ and $B_2$. Simultaneously with the variation of the induction, the voltage at the electrodes varies between the values $U_1$ and $U_2$ (see FIG. 2b). This voltage is in each case the sum of the required voltage produced by the fluid, which is flowing through, and the perturbing electrochemical potential which is produced at the electrodes.

As can be seen from FIG. 2c, the switch 4 is closed for a short time at the time-point $t_1$, until the control (feedback) amplifier 3 has regulated the total signal of the required voltage and the perturbing potential to zero at the output of the (measuring) amplifier 2. When now at the time-point $t_2$ the induction is switched to the value $B_2$, (FIG. 2a), the corresponding total signal of the required voltage and the perturbing potential is received at the input of the measuring amplifier 2, so that henceforth, due to cancellation of the two perturbing potentials, only the pure required voltage is delivered at the output of the amplifier.

The block diagram shown in FIG. 3 differs from that shown in FIG. 1 in that instead of a single switch 6 and a single store 7 now two switches 12 and 15 and two stores 13 and 14 are provided. The manner of functioning of this block diagram will be clear from the time sequence diagram of FIG. 4.

The compensation of the electrochemical perturbing potential is achieved, as in FIG. 1, by the closing of the switch 4, which here however closes at the beginning of the measurement phase $B_1$. Thereafter the voltage at the output of the measuring amplifier 2 climbs practically linearly in accordance with the following function:

$$U_{A2}(t) = (U_{EC} \cdot t/T + k \cdot v \cdot B_1) \cdot V_1,$$

where $T$ represents the time constant of the rise of the perturbing direct current voltage.

After a time $t_1$, the voltage $U_{A2}(t_1)$ which is present at this time is conveyed to the store 13 by closing of the switch 12, so that the output voltage becomes $U_{A3} = (U_{EC} \cdot t_1/T + k \cdot v \cdot B_1) \cdot V_1$.

After it has been thus conveyed to the store 13, the output voltage $U_{A2}$ of the (measuring) amplifier 2 is regulated to zero by closing of the switch 4. In the measurement phase $B_2$ the output voltage $U_{A2}$ of the (measuring) amplifier rises again according to the function $$U_{A2}(t) = (U_{EC} \cdot t/T + k \cdot v \cdot B_2) \cdot V_1$$

and after a time $t_2$ is conveyed to the store 14 by closing of the switch 15, the output voltage of the store 14 then assuming the following value:

$$U_{A4} = (U_{EC} \cdot t_2/T + k \cdot v \cdot B_2) \cdot V_1$$

These two values are then subtracted from one another in the difference amplifier 16, so that its output voltage assumes the following value:

$$U_{A5} = U_{A4} - U_{A3} = V_1(U_{EC}(t_2/T - t_1/T) + k \cdot v \cdot (B_2 - B_1))$$

If it is ensured that the switches 12 and 15 are both closed at equal times $t_2 = t_1$ after the foregoing compensation, the formula simplifies to:

$$U_{A5} = V_1 \cdot k \cdot v(B_2 - B_1).$$

Thus by this method also one obtains an indication of the flow velocity $v$ which is again independent of the electrochemical perturbing direct current voltage and of the speed of its rise. The described method with double compensation of the electrochemical perturbing direct current voltage entails, with very small required voltages, that greater demands must be made of the compensation circuit in respect of its null-point stability and the correction relationship. Furthermore, in the case where the input signal is overlaid with noise or other perturbing amplitudes, the stored value of the compensation circuit after the second correction may perhaps deviate from the first one. The output signal can accordingly be overlaid with noise because this signal is measured against another standard during the induction phase $B_2$ than it is during the induction phase $B_1$. Because of this, it is better to compensate only once during the whole cycle and, to suppress the effect of the residual direct current voltages, as they also develop in the compensating circuit through storage of for example perturbing signals, to use the method of FIG. 5 and FIG. 6.

In the description of this method it will be assumed in the following that $t_1$ and $T_i$ (the time constant of integration) are small with respect to $t_3$ and $t_4$. These assumptions simplify the calculation, which, exactly carried out, gives the same result, but in a manner which is not so easy to follow.

At the beginning of the measurement period during the induction $B_1$ according to FIG. 6a the electrochemical perturbing D.C. potential $U_{EC}$ is compensated by closing of the switch 4, whereby according to FIG. 6b a standard residual voltage $U_R$ can be fixed. This residual voltage can for example be caused by error voltages of the variable-gain amplifier or by dynamic disturbances at the input of the amplifier 2 during the correction process. When the above compensation has been achieved, the switch 4 opens again. This time-point is taken in the diagrams FIG. 6b and 6c as the time-point $t = 0$. With this definition the output voltage after the compensation rises according to the equation $$U_{A1}(t) = U_R + V_1 \cdot U_{EC} \cdot t/T$$

This value is then, for example, directly after opening of the switch 4, led into the input of the integrator 20 through the weighting component 17 with the constant factor A with the constant of integration $T_i$ by closing of the switch 18 for the time-period $t_1$, so that its output voltage owing to the assumption $t_1$ is less than $t_3$, $U_{A2}$ assumes the value $$U_{A2}(t_1) = t_1/T_i \cdot A \cdot U_R$$

and retains it after opening of the switch 18. Thereafter the induction changes according to FIG. 6a to the value $B_2$. After the elapse of the time $t_2$, the switch 19 closes for the time $t_1$ and connects the voltage $U_{A1}$ which has now grown to $$U_{A1}(t_2) = U_R + V_1 \cdot \frac{U_{EC}}{T} \cdot t_2 + (B_2 - B_1) \cdot V_1 \cdot k \cdot v$$

with the input of the integrator 20, whose output voltage is still at the value $U_{A2}(t_1)$, so that to this voltage there is added the integral of $U_{A1}(t_2)$ over the period $t_1$. Thus at the output of the integrator the value $$U_{A2}(t_2 + t_1) = U_{A2}(t_1) + \frac{t_1}{T_i} \cdot U_{A1}(t_2)$$
$$= \frac{t_1}{T_i}(U_R(1 + A) + V_1(U_{EC} \cdot \frac{t_2}{T} + k \cdot v \cdot (B_2 - B_1)))$$

is received.

This value remains at the output of the integrator after opening of the switch 19. After the lapse of the time $t_3$ and alteration of the induction to the value $B_1$, the voltage has altered to the value $$U_{A1}(t_3) = U_R + U_{EC} \cdot V_1 \cdot \frac{t_3}{T} \; ;$$

This value of the voltage $U_{A1}(t_3)$ is again applied to the input of the integrator 20 through the closing of the switch 18 for the time $t_1$ through the weighting component 17 with the constant factor A, so that to the value of the voltage $U_{A2}(t_2)$ present at the output thereof there is added the integral of the voltage $U_{A1}(t_3)$ over the time $t_1$ and its output voltage according to FIG. 6c ($U_{A2}$) changes to the value $$U_{A2}(t_3 + t_1) = U_{A2}(t_2) + \frac{t_1}{T_i} \cdot U_{A1}(t_3)$$

$$= \frac{t_1}{T_i} \left( U_R(1 + 2A) + V_1 \cdot U_{EC} \left( \frac{t_2}{T} + \frac{t_3}{T} \cdot A \right) \right.$$

$$\left. + k \cdot v \cdot (B_2 - B_1) \cdot V_1 \right)$$

On the condition that $t_3 = 2 \, t_2$, and that the weighting component 17 has the constant factor $A = -\frac{1}{2}$, the equation simplifies to $$U_{A2}(t_3 + t_1) = \frac{t_1}{T_i} \cdot k \cdot v \cdot (B_2 - B_1) \cdot V_1$$

The required signal, purified of all disturbing magnitudes, is therefore conveyed to the store 23 by closing of the switch 22 and is continually available at the output of the store. The integrator content is then removed by closing of the switch 21, so that at the beginning of the next measurement cycle it can start again from defined initial conditions.

Instead of the two switches 18 and 19, and the single weighting component 17, several switches and several weighting components can also be provided; thus the conditions $$A = -\frac{1}{2} \text{ and } t_3 = 2 \, t_2$$

Furthermore it is possible, in the same functional sequence, to use instead of the integrator 20 in this circuitry several stores and a difference amplifier. However, for suppression of disturbances of fixed frequency, it is necessary, near the phase-fixed coupling to the disturbing frequency, as is sufficient with a method according to FIG. 5 and 6, for the store to accomplish a further balance in amplitude and phase. Also it is possible for the weighting of the single signals to be carried out after storing or integration, whereby the values are then integrated singly, the integrator voltage transferred into the store and the integrator released after integration of the single signals.

We claim:

1. Method of compensating for a perturbing electrochemical potential present at the electrodes in inductive measurement of fluid flow using a uniform field switched back and forth between two values of induction wherein a required voltage indicative of the fluid flow rate is combined with the electrochemical potential present to form a total signal which is processed by a signal processing chain, said method comprising the steps of:
   summing and regulating to zero the total signal of the required voltage and perturbing potential at a first value of the said two values of induction, at the output of a measuring amplifier by applying a corresponding compensating magnitude to a suitable point in the signal processing chain, and
   compensating the perturbing potential contained in the total signal from the second of said two induction values, by said magnitude 2. Method according to claim 1, wherein the compensating magnitude is applied through a control (feedback) amplifier.

3. Method according to claim 1, which further comprises: suppressing errors which result from slow time-dependent variations of the electrochemical perturbing potential by determining these variations of the perturbing potential, independent of an actual measurement of the required voltage, by interpolation, estimating the value of the perturbing potential, and using the so estimated value as correcting values.

4. Method according to claim 3, which further comprises:
   compensating a sum of the perturbing potential during a first value of the induction;
   measuring and storing during a second value of the induction, the variations of said perturbing potential as correcting value;
   repeating said compensating step;
   measuring during said second value of induction, the sum of the required signal and the variations of the perturbing potential; and
   subtracting from this sum the correcting value.

5. Method according to claim 3, which further comprises;
   measuring and storing, during the one induction value after the compensation of the electrochemical potential and other perturbing magnitudes, the correcting value as a first correction signal;
   measuring and storing, a fixed time after the first measurement during the second induction value, a total value of the required voltage, the compensation values and variations of the values of the perturbing magnitudes;
   measuring and storing, when the induction again has its first said value in the same time interval thereafter, a sum of the compensation values and variations of the perturbing magnitudes, as a second correcting value; and
   subtracting the mean of the first and second correcting values from the total signal measured with the second induction value.

6. Method according to claim 1, wherein the corresponding compensating magnitude is applied to the input of the measuring amplifier.

7. Method according to claim 1, which further comprises:
   suppressing errors which result from slow time-dependent variations of the electrochemical perturbing potential by determining these variations of the perturbing potential, independent of an actual measurement of the required voltage, by extrapolation, estimating the value of the perturbing potential, and using the so estimated value as correcting values.

8. In an electromagnetic flow meter for measuring the velocity of a fluid, including a generator means for generating a magnetic field within the fluid which periodically varies between two magnetic states and electrode means positioned in the fluid for measuring potential gradients set up thereacross, said potential gradients having a first component proportional to the velocity of the fluid and a second component equal to the electrochemical potential formed at said electrode means, an apparatus for compensting for said electrochemical potential, comprising:
- a measuring amplifier having first inputs connected to said electrode means;
- a feedback amplifier having an input connected to the output of said measuring amplifier;
- a first storage means for storing the output of said feedback amplifier when said magnetic field is in a first of said magnetic states, and for providing an output connected to a control input of said measuring amplifier;
- said feedback amplifier operating during said first magnetic state to receive said first and second components of said potential gradient from the output of said measuring amplifier and generate a signal which is applied through said first storage means to said control input of said measuring amplifier, to reduce the magnitude of the output signal from said measuring amplifier to zero;
- a second storage means for storing the output of said feedback amplifier when said magnetic field is in a second one of said magnetic states, and for providing an output equal to said first component without said second component.

9. In an electromagnetic flow meter for measuring the velocity of a fluid, including a generator means for generating a magnetic field within the fluid which periodically varies between first and second magnetic states and electrode means positioned in the fluid for measuring potental gradients set up thereacross, said potential gradients having a first component proportional to the velocity of the fluid and a second component equal to the electrochemical potential formed at said electrode means, an apparatus for compensating for said electrochemical potential, comprising:
- a measuring amplifier having a control input and responsive to said electrode means and providing an output;
- a feedback amplifier having an input connected to the output of said measuring amplifier;
- a first storage means for storing the output of said feedback amplifier during initial and final periods of a time when said magnetic field is in a first of said magnetic states, said storage means further providing an output to a control input of said measuring amplifier;
- said feedback amplifier, operating during said initial and final periods of said first magnetic state to receive said first and second components of said potential gradient from the output of said measuring amplifier, for generating a signal which is applied through said first storage means to said control input of said measuring amplifier, to reduce the magnitude of said output from said measuring amplifier to zero;
- a second storage means responsive to the output of said measuring amplifier during an intermediate period between said initial and said final periods of said first magnetic state, having and output terminal for storing said first and second components of said potential gradient during said intermedient period;
- a third storage means responsive to the output of said measuring amplifier for a next period commencing when said magnetic field enters into said second of said magnetic states, having an output terminal for storing said first and second components of said potential gradient during said next period;
- a difference amplifier having a first input responsive to the output of said second storage means and a second input responsive to the output of said third storage means, having an output terminal, for generating a signal representing the difference between said components stored in said second and third storage means;
- whereby the value of said first component of said potential gradient is present at the output of said difference amplifier compensated for the drift in the electrochemical potential of the fluid.

10. In an electromagnetic flow meter for measuring the velocity of a fluid, including a generator means for generating a magnetic field within the fluid which periodically varies between two magnetic states and electrode means positioned in the fluid for measuring potential gradients set up thereacross, said potential gradients having a first component proportional to the velocity of the fluid and a second component equal to the electrochemical potential formed at said electrode means, an apparatus for compensating for said electrochemical potential, comprising;
- a measuring amplifier having first inputs connected to said electrode means;
- a feedback amplifier having an input connected to the output of said measuring amplifier;
- a first storage means for storing the output of said feedback amplifier when said magnetic field is in a first of said magnetic states, said storage means further providing an output to a control input of said measuring amplifier and for reducing the magnitude of the output signal from said measuring amplifier to a residual value;
- a signal weighting means, responsive to the output of said measuring amplifier, for weighting the signal output from said measuring amplifier;
- a signal integrating means, responsive to the output of said signal weighting means during a first of said magnetic states, for integrating the output of said weighting means during said first state;
- said signal integrating means, reponsive to the output of said measuring amplifier during a second of said magnetic states for integrating said measuring amplifier output over a time duration equal to said first state;
- said signal integrating means responsive to the output of said signal weighting means during a subsequent first state of said magnetic field, for further providing an output which is compensated for the drift in electrochemical potential of the fluid.

11. The apparatus of claim 10, which further comprises;
- a second storage means, responsive to the output of said integrating means, for storing the value of said output compensated for the drift in electrochemical potential of the fluid.

12. The apparatus of claim 10, wherein said signal weighting means applies to a weight of minus one half to the output of said measuring amplifier.

* * * * *